Figure 1:
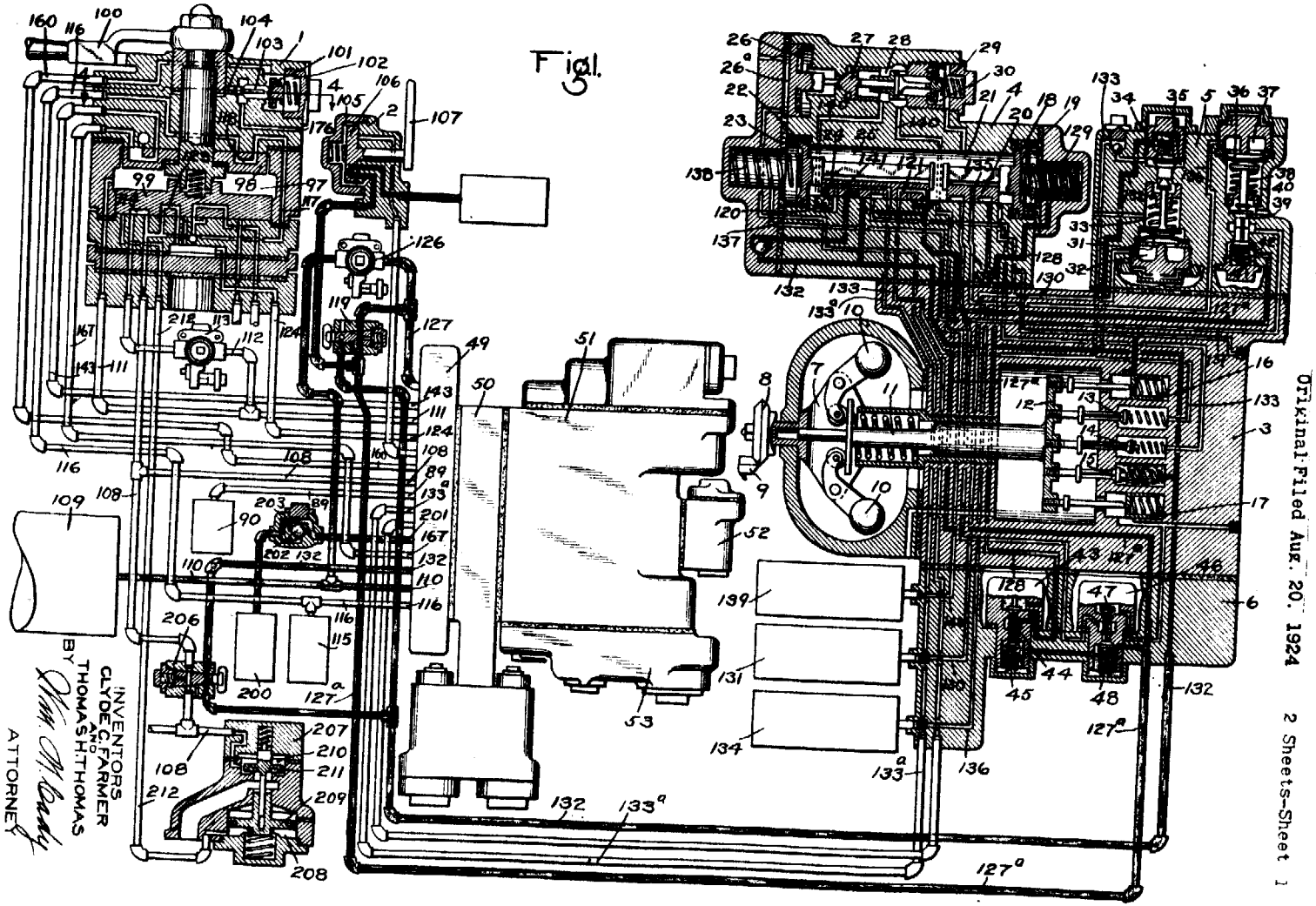

Dec. 13, 1927.

C. C. FARMER ET AL

SPEED CONTROL EQUIPMENT

Original Filed Aug. 20, 1924

Re. 16,814

2 Sheets-Sheet 1

INVENTORS
CLYDE C. FARMER
AND
THOMAS H. THOMAS
BY Wm. M. Cady
ATTORNEY

Dec. 13, 1927.
C. C. FARMER ET AL
SPEED CONTROL EQUIPMENT
Original Filed Aug. 20, 1924
Re. 16,814
2 Sheets-Sheet 2
Fig. 2.
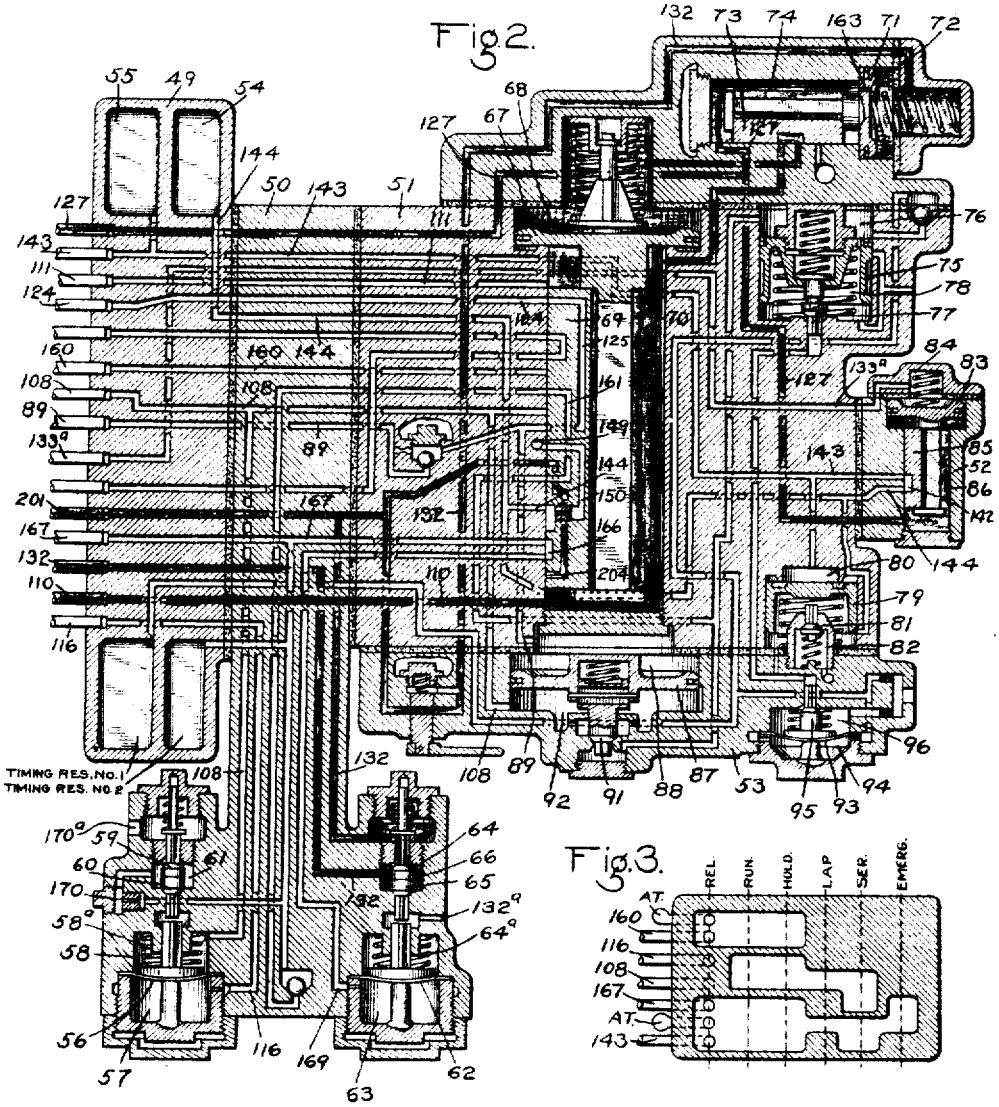
Fig. 3.
Fig. 4.
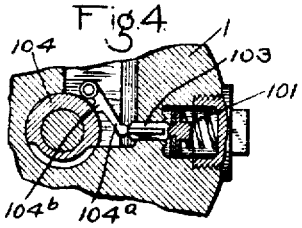
INVENTORS
CLYDE C. FARMER
AND
THOMAS H. THOMAS
BY
Wm. M. Bailey
ATTORNEY

303 FLUID PRESSURE BRAKE,
& ANALOGUOUS SYSTEMS.

Reissued Dec. 13, 1927. Re. 16,814

UNITED STATES PATENT OFFICE.

CLYDE C. FARMER, OF PITTSBURGH, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

SPEED-CONTROL EQUIPMENT.

Original No. 1,553,603, dated September 15, 1925, Serial No. 733,084, filed August 20, 1924. Application for reissue filed January 28, 1927. Serial No. 165,509.

This invention relates to automatic train speed control apparatus and has for its principal object to provide certain improvements in the train control equipment as disclosed in the prior pending application of Clyde C. Farmer and Thomas H. Thomas, Serial No. 692,970, filed February 15, 1924.

In the accompanying drawings: Fig. 1 is a diagrammatic view, partly in section, of an automatic train speed control equipment embodying our invention; Fig. 2 a central sectional view of the brake application valve unit of the train control equipment; Fig. 3 a diagrammatic view, in which the port connections made by the brake valve in its different positions may be traced; and Fig. 4, a section on the line 4—4 of Fig. 1.

In general, the equipment may comprise a governor valve unit, a brake application valve unit, a brake valve device 1, and an acknowledging valve device 2.

The governor valve unit may comprise a centrifugal governor portion 3, a change speed valve portion 4, a timing portion 5, and a magnet and pipe bracket portion 6. The governor portion 3 comprises a rotatable member 7, having a pinion 8 meshing with a pinion 9, the pinion 9 being operatively connected to a locomotive axle, so as to rotate at a speed which varies according to the speed of the train. The member 7 carries governor bails 10 adapted to operate a spindle 11, in accordance with the speed of the train. A cross head 12 is carried by the spindle 11 and is adapted to operate a series of governor valves 13, 14, and 15, and blow down timing valves 16 and 17.

The change speed valve portion 4 comprises a casing containing a high speed valve device, a medium speed valve device, and an acknowledging pilot valve device. The high speed valve device comprises a piston 18 contained in piston chamber 19 and a slide valve 20 contained in valve chamber 21 and adapted to be operated by piston 18. The medium speed valve device comprises a piston 22 contained in piston chamber 23 and a slide valve 24 contained in valve chamber 25 and adapted to be operated by piston 22. The acknowledging pilot valve device may comprise a piston 26 contained in piston chamber 26[a], a valve piston 27 contained in valve chamber 28, and a cavity 29 contained in valve chamber 30, said valve piston 27 and the valve 29 being operable by piston 26.

The timing portion 5 comprises a casing containing a high to medium speed timing valve device and a medium to low speed timing valve device. The high to medium speed timing valve device comprises a flexible diaphragm 31, subject on one side to the pressure in diaphragm chamber 32 and on the opposite side to the pressure of a coil spring 33, the diaphragm 31 being adapted to operate a double beat valve 34, contained in valve chamber 35. The medium to low speed valve device comprises a flexible diaphragm 36, subject on one side to the pressure in a diaphragm chamber 37 and on the opposite side to the pressure of a coil spring 38, the diaphragm 36 being adapted to operate a valve 39 contained in spring and valve chamber 40 and a valve 41, contained in valve chamber 42.

The magnet and pipe bracket 6 comprises a casing to which all the controlling pipes of the governor unit are connected and said casing contains a high speed magnet valve device and a medium speed magnet valve device. The high speed magnet valve device comprises a magnet 43 and valves 44 and 45 operable by said magnet. The medium speed magnet valve device comprises a magnet 46 and valves 47 and 48, operable by the magnet 46.

The brake application valve unit may comprise a pipe bracket portion 49, a brake pipe reduction ensuring and brake application suppressing portion 50, a brake application portion 51, a split reduction cut-out portion 52, and an equalizing discharge valve portion 53.

The pipe bracket portion 49 comprises a casing to which all of the controlling pipes of the brake application valve unit are connected and said casing contains a first reduction chamber 54, a second reduction chamber 55, a timing reservoir No. 1, and a timing reservoir No. 2.

The brake pipe reduction ensuring and brake application suppressing portion 50 comprises a casing containing a brake pipe reduction ensuring valve device and a brake application suppressing valve device. The brake pipe reduction ensuring valve device may comprise a flexible diaphragm 56, subject to the opposing fluid pressures in diaphragm chambers 57 and 58 and to the pressure of a coil spring 58[a] in chamber 58, said diaphragm being adapted to operate valves 59 and 60 contained in valve chamber 61. The brake application suppressing valve device may comprise a flexible diaphragm 62, subject on one side to the pressure in diaphragm chamber 63 and on the other side to the pressure of a coil spring 64[a], said diaphragm being adapted to operate valves 64 and 65, contained in valve chamber 66.

The brake application portion 51 comprises a casing containing a brake application valve device, a pilot piston valve device, a reduction timing valve device, and a reduction hold back valve device. The brake application valve device may comprise a piston 67, contained in piston chamber 68, and a slide valve 69, contained in valve chamber 70 and adapted to be operated by piston 67. The pilot piston valve device may comprise a piston 71, contained in piston chamber 72 and a slide valve 73, contained in valve chamber 74, and adapted to be operated by piston 71.

The reduction timing valve device may comprise a piston 75, subject on one side to the pressure in piston chamber 76, and a valve 77, contained in the valve and piston chamber 78 and adapted to be operated by piston 75. The reduction hold back valve device may comprise a piston 79, subject on one side to the pressure in piston chamber 80, and a valve 81, contained in valve chamber 82 and adapted to be operated by piston 79.

The split reduction cut-out portion 52 includes a piston 83, contained in piston chamber 84, and a slide valve 85, contained in valve chamber 86 and adapted to be operated by piston 83.

The equalizing discharge valve portion 53 contains an equalizing discharge valve mechanism comprising a piston 87, having the chamber 88 at one side connected through pipe and passage 89 with an equalizing reservoir 90, and a valve 91, contained in chamber 92 at the opposite side of the piston and adapted to be operated by said piston. The portion 53 also contains a reduction safety valve device comprising a flexible diaphragm 93, subject on one side to the pressure in diaphragm chamber 94, and a valve 95, contained in valve and diaphragm chamber 96, and adapted to be operated by said diaphragm.

The brake valve device 1 may comprise an upper casing section, a lower casing section, and an intermediate casing section. Contained in the intermediate casing section is a valve chamber 97, containing an upper rotary valve 98 and a lower rotary valve 99, both valves being operable by handle 100. The upper casing section contains a release pilot valve 101 disposed in valve chamber 102 and having a stem 103 adapted to engage the end of a pivoted lever 104[a], said lever having a projecting portion 104[b] adapted to engage a cam 104 associated with and movable by the operation of the handle 100, as more clearly shown in Fig. 4.

The acknowledging valve device 2 may comprise a casing having a valve chamber 105, containing a rotary valve 106, adapted to be operated by a handle 107.

With the brake valve in running position, as shown in Fig. 1, the brake pipe 108 is maintained charged to the standard pressure from the main reservoir 109, from which fluid flows through pipe and passage 110 to valve chamber 70 and thence, with the slide valve 69 in the normal release position as shown, through pipe and passage 111 to the rotary valve chamber 97 of the brake valve device. In running position, fluid is supplied from the pipe 111, through pipe 112 and the usual pressure reducing feed valve device 113 to the brake pipe 108, by way of cavity 114 in the rotary valve 99.

The brake pipe 108 is connected in the usual manner to the piston chamber 92 of the equalizing discharge valve mechanism and is also connected to the diaphragm chamber 58 of the reduction ensuring valve device.

A capacity reservoir 115 is connected to pipe and passage 116 which leads to diaphragm chamber 57 of the reduction ensuring valve device and said reservoir is charged with fluid under pressure from the brake pipe 108 through passage 117 in the brake valve device and cavity 118 of the rotary valve 98.

The equalizing reservoir 90 and the piston chamber 88 of the equalizing discharge valve mechanism are charged to brake pipe pressure by way of cavity 123 in the rotary valve 99, pipe and passage 124, and cavity 125 in the application slide valve 69.

The valve chamber 74 of the pilot valve device is charged with fluid at a pressure less than main reservoir pressure by way of a feed or reducing valve device 126 and pipe and passage 127. The valve chamber 86 of the split reduction cut-off valve device is also charged with fluid from passage 127. Piston chamber 105 of the acknowledging valve 2 is also charged with fluid under pressure from the pipe 127, by way of a cut-out cock 119.

Assuming that the train is running under a high speed signal indication, the high speed magnet 43 will be energized and the medium speed magnet 46 will be deenergized. The valve 44 will then be seated and the valve 45 unseated, so as to supply fluid at feed valve pressure from pipe 127[a] to passage 128, leading to piston chamber 19 of the high speed valve device, and since the valve chamber 21 is also charged with fluid under pressure from pipe and passage 127ᵃ, the piston 18 will be held in its inner position by spring 129. In this position, the slide valve 20 opens communication from valve chamber 21, through passage 130 to diaphragm chamber 32 of the high to medium speed timing valve device and to the high to medium reservoir 131, so that said chamber and the reservoir are charged with fluid at feed valve pressure. The diaphragm 31 then moves the valve 34 to close communication from passage 132 to passage 133. Passage 132 leads from piston chamber 72 of the pilot valve device, past the open valve 64 of the application suppressing valve device, and passage 133 leads to the medium speed governor valve 13, so that communication is now cut off from the pilot piston 71 to the medium speed governor valve 13.

In the high speed position of slide valve 20, the diaphragm chamber 37 of the medium to low timing valve device and the medium to low reservoir 134 are also charged with fluid at feed valve pressure from valve chamber 21, through port 135 in slide valve 20, and passage 136, so that diaphragm 36 is operated to close valve 39 and open valve 41. Fluid at feed valve pressure is then supplied from feed valve passage 127ᵃ to passage 137, leading to the piston chamber 23 of the medium speed valve device. The medium speed piston 22 being thus subject to fluid at feed valve pressure on its opposite sides, said piston will be shifted to its inner position by spring 138. In this position, the slide valve 24 connects the stop reservoir 139, through passage 140 and cavity 141 in slide valve 24, with an atmospheric exhaust port 120.

The passage 133 also leads to the seat of slide valve 24 of the medium speed valve device, but is blanked by the slide valve when the valve is in its inner position, as shown in Fig. 1.

As the construction and operation of the split reduction portion of this application is substantially the same as that of our prior application, Serial No. 692,970, hereinbefore referred to, the same will not be described in detail. The manner in which the cut-out valve device is controlled, however, is different from that of said prior application and will now be described.

Pipe and passage 133ᵃ is connected to piston chamber 84 of the split reduction cut-out valve device and leads to the seat of the medium speed slide valve 24 and in the inner position of said slide valve, the passage 133ᵃ is connected through cavity 141 with atmospheric exhaust port 120. The piston chamber 84 is therefore vented to the atmosphere, so long as the slide valve 24 remains in its inner position. The operation of the apparatus is such that the medium speed valve device remains in its inner position when subject to either a high or medium speed signal indication and only moves to its outer position when a low speed signal indication is received.

When the piston chamber 84 is vented to the atmosphere, as above described, the fluid pressure acting in valve chamber 86, causes the movement of piston 83 to its outer position. In this position, passage 143, leading to the second reduction reservoir 55, is connected, through cavity 142 in slide valve 85, with passage 144, leading to the first reduction reservoir 54, so that the two reservoirs are now connected together and operate as a single reservoir. When the reservoirs 54 and 55 are connected together, the split reduction feature is prevented from functioning. Passage 144 is connected to exhaust port 149, through a cavity 150 in slide valve 69, when the application piston 67 is in its normal release position, so that both reservoirs 54 and 55 are now maintained at atmospheric pressure.

When the split reduction cut-out piston 83 is in its inner position, the reduction reservoirs 54 and 55 do not communicate with each other and the split reduction mechanism then operates to effect a two stage reduction in brake pipe pressure, substantially in the same manner as described in our prior application, Serial No. 692,970, hereinbefore referred to.

When a low speed signal indication is received, the control apparatus operates so that fluid is vented from piston chamber 23 of medium speed piston 22 by way of passage 137, so that said piston is shifted to its outer position. In this position, a cavity 121 in slide valve 24 connects passage 133ᵃ to passage 133 and also to feed valve passage 127ᵃ. Passage 133 leads to the medium speed governor controlled valve 13, and if the speed of the train exceeds the medium speed limit, said valve will be held open by the operation of the speed governor and the passage 133ᵃ and consequently the piston chamber 84 will be maintained at atmospheric pressure, the same as when the piston 22 is in its inner position. If, however, the speed of the train is less than the medium speed limit, the valve 13 will be closed, and the fluid pressure in piston chamber 84 will be built up by flow from the feed valve passage 127ᵃ, through cavity 121, and passage 133ᵃ.

The piston 83 will then be shifted to its inner position, in which communication between the reduction reservoirs 54 and 55 is cut off, so that the split reduction mechanism will now operate to effect a reduction in brake pipe pressure in two stages.

Another feature of the present construction consists in providing a reduction ensuring valve device which will ensure that a predetermined reduction in brake pipe pressure will be obtained when the engineer makes a service application of the brakes, regardless of the standard brake pipe pressure which may be carried in the system, and which will then ensure the suppression of an automatic train control brake application.

The operation of the above mentioned feature is as follows: With the brake valve in either running or holding position, the diaphragm chamber 57 of the reduction ensuring valve device is connected to the brake pipe 108 by way of pipe and passage 116, cavity 118 in the rotary valve 98, and passage 117. Diaphragm chamber 58 is also connected to the brake pipe 108 and the diaphragm 56 at this side is subject to the pressure of a spring 58ª which is such as to provide a predetermined differential pressure, such as twenty-four pounds, for example.

Under the above conditions, the diaphragm 56 will be maintained in the position shown in Fig. 2, permitting the valve 60 to seat and with the valve 59 unseated. The diaphragm chamber 63 of the reduction suppression valve device is therefore connected to the atmosphere by way of passage 169, cavity 166 in application slide valve 69, passage 167, through a restricted port 170 and past the open valve 59 to atmospheric exhaust port 170ª.

The diaphragm 62 will then be maintained in its lower position by spring 64ª, permitting valve 64 to open. With valve 64 open, communication is established through passage 132, so that the pilot piston 71 is subject to operation when the automatic train control apparatus functions, due to a change in the signal indication.

When the engineer moves the brake valve to service position, so as to effect a service application of the brakes, the pipe and passage 116 is blanked, so that the brake pipe is cut off from diaphragm chamber 67, which remains subject to the bottled up pressure in the pipe and passage 116 and the volume reservoir 115.

In service position, the brake valve operates to vent fluid from the chamber 88 at one side of the equalizing discharge piston 87 and from the equalizing reservoir 90, through passage 89, cavity 125 in application slide valve 69, passage 124, and through ports controlled by the rotary valve 98 of the brake valve device. The piston 87 is then moved by the higher brake pipe pressure in chamber 92, so as to open the discharge valve 91 for venting fluid from the brake pipe. As chamber 58 is connected to the brake pipe 108, the pressure therein will reduce with the brake pipe. If the brake pipe pressure is reduced to an extent slightly exceeding the value of spring 58ª, which in the example given was twenty-four pounds, the bottled up pressure in chamber 57 will operate the diaphragm 56 so as to close the valve 59 and open the valve 60.

The closing of valve 59 ensures that the operation of the automatic train control apparatus to apply the brakes will be suppressed, which will be understood from the following description of the functioning of the reduction suppression valve device. When the equalizing discharge valve 91 is opened by the engineer in effecting a service application of the brakes, the chamber 63 is subjected to the pressure of fluid discharged from the brake pipe, and this pressure acts on diaphragm 62 against the resistance of spring 64ª to close the valve 64. With valve 64 closed, communication through passage 132 is cut off, so that the pilot piston 71 is prevented from operating under conditions where an automatic train controlled application would otherwise be effected. When the discharge valve 91 closes, due to the engineer moving the brake valve to lap position or otherwise, the pressure in chamber 63 will be vented by way of the valve 59, if the reduction in brake pipe pressure has not been sufficient to effect the operation of the diaphragm 56 so as to close the valve 59. As a consequence, the valve 64 will be opened, so that communication is established through passage 132 and under certain conditions, the brakes will then be automatically applied by the operation of the pilot piston 71 and the application valve device. If the reduction has been sufficient to effect the closure of valve 59, then the fluid pressure in chamber 63 will be maintained by flow from the brake pipe 108, past the open valve 60, and through passage 167, cavity 166, and passage 169 to chamber 63, and the diaphragm 62 will be maintained in its upper position, maintaining the valve 64 closed and thus suppressing an automatic train controlled application of the brakes.

The spring 64ª is employed to prevent the operation of diaphragm 62 by possible leakage from the equalizing discharge valve 91. Said spring may be such as to require a pressure of twenty pounds, for example, to compress same. Any leakage past the discharge valve which is sufficient to build up twenty pounds pressure in chamber 63 and at the same time discharge by way of exhaust port 170ª would be sufficient to equal that of a service brake pipe reduction made in the desired time to produce a brake application on a long train, and consequently, the diaphragm 62 will not be operated by leakage to effect the suppression of an automatic train controlled brake application when not intended.

In addition to the action of the pressure of fluid discharged from the brake pipe by

& ANALOGOUS SYSTEMS.

Examiner

8 operation of the discharge valve 91 in operating the diaphragm 62 so as to suppress the operation of a train control brake application, the maintaining of the reduction suppression valve device in its suppressing position is facilitated by connecting the pipe and passage 167 to the brake valve device and by providing ports in the brake valve device for connecting the pipe 167 with the brake pipe 108 when the brake-valve device is in service position. In release, running, and holding positions, the pipe 167 is connected by a cavity in the upper rotary valve 98 with an exhaust port.

Passage 167 is connected through a cavity 166 in the application slide valve 69 with passage 169 leading to the diaphragm chamber 63, so that when the application valve device moves to brake application position, communication from the diaphragm chamber 63 to the brake valve device is cut off and thus the operation of the reduction suppression valve device to suppress an automatic train control application of the brakes is prevented if the slide valve 69 has been shifted to application position, even though the engineer should move the brake valve to service application position.

When a two stage reduction in brake pipe pressure is effected by operation of the train control apparatus, the second stage of reduction in brake pipe pressure is produced by discharging fluid vented from the brake pipe by operation of the discharge valve 91 to a second reduction reservoir 55.

If, at the time a two stage reduction in brake pipe pressure is being effected, the engineer should become incapacitated for any reason, means are provided whereby the reduction in brake pipe pressure will continue without regard to the reservoir 55 unless the brake valve is turned to lap position.

For this purpose, the pipe and passage 143, leading to reservoir 55, is connected to the seat of the upper rotary valve 98 of the brake valve device. In running, release, and holding positions of the brake valve, said pipe is connected through a cavity in the rotary valve 98 with an exhaust port, so that if the train control apparatus should operate while the brake valve remains in any one of the above positions, the discharge of fluid from the brake pipe by way of the discharge valve 91 will continue and will not be limited by equalization into the reservoir 55. In lap position of the brake valve, the pipe 143 is blanked at the brake valve, so that if the engineer moves the brake valve to lap position, the reservoir 55 will function as intended to determine the amount of the second stage of reduction in brake pipe pressure.

If the engineer makes a sufficient reduction in brake pipe pressure to cause the reduction suppression valve device to operate so as to suppress a train control application of the brakes, the pipe and passage 132 leading from the speed governor controlled valves will be at atmospheric pressure by reason of the connection of passage 132 past the open valve 65 to exhaust port 132[a], so that when the speed of the train has been reduced below the speed limit indicated by the signal indication and the engineer desires to effect the release of the brakes by moving the brake valve to release or running position, the release may be prevented and the pilot valve 71 caused to act due to the connection of the atmospheric volume of pipe and passage 132 between the suppression valve device and the speed governor valves to that portion of the passage 132 which leads to the pilot piston chamber 72. This may cause a sufficient reduction in pressure in chamber 72 to effect the movement of piston 71 to application position and the consequent operation of the application valve device. In order to prevent the above action, a quick release reservoir 200 is provided which is connected by pipe 201 to the pilot piston side of the passage 132.

Interposed in pipe 201 is a check valve 202, the casing of which is provided with a restricted charging port 203. In the normal release position of the pilot piston 71, the piston chamber 72 and pipe and passage 132 are charged with fluid under pressure from valve chamber 74, through a restricted port 163 in piston 71 and the release reservoir 200 is then charged from passage 132 by way of the restricted port 203.

When the engineer operates the brake valve device to effect the release of the brakes after the speed of the train has been reduced below the indicated speed limit, the suppression valve device will be operated to the position shown in Fig. 2 and the fluid under pressure previously stored in the release reservoir 200 will flow past the check valve 202 to the pipe and passage 132, so as to quickly recharge said pipe and passage and thus prevent the possible movement of the pilot piston 71 to application position.

When the application slide valve 69 is moved to application position, passage 169 is connected through cavity 204 with exhaust port 149. By this means, any leakage which may occur at the slide valve 69 will be prevented from building up pressure in the diaphragm chamber 63, which building up of pressure, if permitted, might cause the movement of the suppression valve device to its suppressing position.

The restricted port 170 is located in passage 167, so that fluid will flow through said port and then past the valve 59 to the exhaust port 170[a]. By this means, possible leakage past the valve 60, when said valve is in its closed position, can escape past the open valve 59 to the unrestricted exhaust port 170[a].

In order to provide for the release of the brakes by the engineer after an automatic train control application, a release valve 101 is provided. In the release, running, and holding positions of the brake valve, the valve 101 is held unseated by the engagement of a cam 104, movable with the brake valve handle 100, through the lever 104[a], with the stem 103 of the release valve. When the release valve 101 is in its open position, pipe and passage 160 is connected to an exhaust port 176. With the application slide valve 69 in application position, the passage 160 is connected through a cavity 161 with passage 132, so that the piston chamber 72 of the pilot piston 71 is connected to the atmosphere, after the application valve device has been operated, so long as the brake valve device is left in one of the above mentioned positions. The release is thus prevented unless the engineer moves the brake valve device to lap position, in which the release valve 101 is allowed to seat. The seating of the release valve 101 permits the recharging of the passage 132 and the piston chamber 72 by way of the restricted port 163 through piston 71 and the consequent movement of the pilot valve device to release position. The movement of the pilot valve 73 to release position effects the movement of the application valve device to release position and then upon movement of the brake valve device to release position, the brake pipe may be recharged and the brakes released in the usual manner.

The cut-out cock 119 is provided for use when double heading or when operating in nontrain controlled territory. Normally the cock 119 remains in the position shown in Fig. 1, in which communication is established from the feed valve device 126 to the feed valve pressure pipe 127[a]. In double heading or when operating in nontrain controlled territory, the cock is turned to its cut-out position, in which communication from the feed valve device 126 to the feed valve pipe 127[a] is cut off. When operating in nontrain controlled territory, the train control magnets 43 and 46 will be deenergized, resulting in the medium speed piston 22 and the slide valve 24 being shifted to their outermost or low speed position. In this position, the piston chamber 84 of the split reduction cut-out valve device is connected to the feed valve supply pipe 127[a] by way of pipe 133[a] and cavity 121 in slide valve 24.

The pipe 127[a] is also connected in this position with the medium speed governor valve 13, which is open when the speed of the train exceeds the medium speed limit. It will thus be seen that unless the supply of fluid under pressure to the feed valve pipe 127[a] is cut off, there would be a loss of fluid pressure when the medium speed valve 13 is open and also the possibility of operation of the split reduction cut-out valve device by fluid pressure supplied to pipe 133[a].

Pipe 132 is also connected to the cut-out cock 119 and said pipe is vented to the atmosphere in the cut-out position of the cock, so that on the second locomotive, in double heading, with the cut-out cock 119 in its cut-out position, the operation of the train control apparatus on the second locomotive will be prevented.

The pipe 127 which supplies feed valve pressure to the valve chamber 74 of the pilot piston valve device is not disturbed when the cock 119 is turned to its cut-out position, so that the valve chamber 74 will be maintained charged with fluid under pressure and the slide valve 73 will be prevented from being lifted from its seat by main reservoir pressure which acts on the under side of the slide valve.

A cut-out cock 206 controls communication from the brake valve device 1 through the brake pipe 108 and in double heading, on the second locomotive, said cock is turned to its cut-out position, in which communication from the brake valve device to the brake pipe is cut off, the purpose being to permit the control of the brake pipe pressure only on the leading locomotive. The cock 206 also controls communication from the governor valve portion of the train control apparatus to the application portion, so that if the engineer should neglect to turn the cut-out cock 119 to its open position, when the locomotive is taken out of double heading service, the turning of the cut-out cock 206 to its position (which is necessary in order to again connect the brake pipe to the brake valve), will connect the application pipe 132 with the exhaust port of the cut-out cock 119 and will thus cause the operation of the application portion of the train control apparatus so as to effect an application of the brakes.

In order to permit the engineer to make an emergency application of the brakes on the second locomotive in double heading when the cut-out cock 206 is in its closed position, a relay vent valve device 207 is provided comprising a casing having a piston chamber 208 containing a piston 209 and a valve chamber 210 containing a valve 211 adapted to be operated by piston 209. The valve 211 when opened, is adapted to vent fluid from the brake pipe 108.

The piston chamber 208 is connected to a pipe 212 which leads to the seat of the rotary valve 99 of the brake valve device. When the brake valve device is moved to emergency position, fluid under pressure is supplied through pipe 212 to piston chamber 208 and the piston 209 is thereupon op-

103. FLUID PRESSURE BRAKE
& ANALOGOUS SYSTEMS

Examiner

18 erated to unseat the valve 211 and thus effect a sudden reduction in brake pipe pressure.

Having now described our invention, what we claim as new and desire to secure by Letters Patent, is:—

1. In an automatic train control apparatus, the combination with a brake pipe, of means operative upon a change in the signal indication for at one time effecting a reduction in brake pipe pressure in a single stage and at another time in two stages.

2. In an automatic train control apparatus, the combination with a brake pipe, of means operating in accordance with the character of the change in the signal indication for either effecting a reduction in brake pipe pressure in one stage or in two stages.

3. In an automatic train control apparatus, the combination with a brake pipe, of means normally operative upon a change in the signal indication for effecting a reduction in brake pipe pressure in one stage and operative upon a change in the signal indication to danger or low speed for effecting a reduction in brake pipe pressure in two stages.

4. In an automatic train control apparatus, the combination with a brake pipe, of means for automatically effecting a reduction in brake pipe pressure in two stages, a valve device having positions for cutting said means into and out of action, and means operating only upon a change in the signal indication to low speed for effecting the movement of said valve device to its cut in position.

5. In an automatic train speed control apparatus, the combination with a brake pipe, of means for automatically effecting a reduction in brake pipe pressure in two stages, a valve device for cutting said means into and out of action, a train speed controlled governor, a valve operated by said governor for controlling the operation of said valve device, and a valve mechanism movable in accordance with a change in the signal indication for controlling communication from said valve to said valve device.

6. In an automatic train speed control apparatus, the combination with a brake pipe, of means for automatically effecting a reduction in brake pipe pressure in two stages, a valve device operated by fluid under pressure for cutting said means into action, and a valve mechanism operated upon a change in the signal indication for supplying fluid under pressure to said valve device.

7. In an automatic train speed control apparatus, the combination with a brake pipe, of means for automatically effecting a reduction in brake pipe pressure in two stages, a valve device operated by fluid under pressure for cutting said means into action, a train speed controlled governor, a valve operated by said governor for venting fluid from said valve device, and a valve mechanism operated upon a change in the signal indication for supplying fluid under pressure to said valve device and for connecting said valve to said valve device.

8. In an automatic train speed control apparatus, the combination with a brake pipe, of means for automatically effecting a reduction in brake pipe pressure in two stages, a valve device operated by fluid under pressure for cutting said means into action, a train speed controlled governor, a valve operated by said governor for venting fluid from said valve device, and a valve mechanism operated upon a change in the signal indication for connecting said valve to said valve device whereby fluid is vented from said valve device when said valve is open, said valve mechanism being adapted to supply fluid under pressure to said valve device when said valve is closed.

9. In an automatic train speed control apparatus, the combination with a split brake pipe reduction controlling means, of a valve device operated by a reduction in fluid pressure for cutting said means out of action and by an increase in fluid pressure for cutting said means into action, and valve means operated according to the signal indication and having one position for supplying fluid under pressure to said valve device and another position for venting fluid from said valve device.

10. In an automatic train speed control apparatus, the combination with a split brake pipe reduction controlling means, of a valve device operated by a reduction in fluid pressure for cutting said means out of action and by an increase in fluid pressure for cutting said means into action, valve means operated according to the signal indication and having one position for supplying fluid to said valve device and another position for venting fluid from said valve device, a train speed controlled governor, and a valve operated by said governor for also venting fluid from said valve device, communication from said valve to said valve device being controlled by said valve means.

11. In an automatic train control equipment, the combination with apparatus operated upon a change in the signal indication for effecting an application of the brakes, of a brake pipe, and means operative to prevent the operation of said apparatus, including a spring and a movable abutment subject on one side to fluid pressure and on the opposite side to brake pipe pressure and the pressure of said spring.

12. In an automatic train control equipment, the combination with apparatus operated upon a change in the signal indication for effecting an application of the brakes, of a brake pipe, and means operative to prevent the operation of said apparatus, including a spring and a movable abutment subject on one side to the pressure in a chamber charged from the brake pipe and on the opposite side to brake pipe pressure and the pressure of said spring.

13. In an automatic train control equipment, the combination with apparatus operated upon a change in the signal indication for effecting an application of the brakes, of a brake pipe, means operative to prevent the operation of said apparatus, including a spring and a movable abutment subject on one side to the pressure of a chamber charged from the brake pipe and on the opposite side to the brake pipe pressure and the pressure of said spring, and a brake valve device having a position for cutting off communication from the brake pipe to said chamber and for effecting a reduction in brake pipe pressure and consequently on the spring side of said abutment.

14. In an automatic train control equipment, the combination with apparatus operated upon a change in the signal indication for effecting an application of the brakes, of a brake pipe, a fluid pressure controlled valve device operative to prevent the operation of said apparatus, a valve device for controlling the fluid pressure on said fluid pressure controlled valve device and comprising valve means, a spring, and a diaphragm for operating said valve means, said diaphragm being subject on one side to the pressure in a chamber charged from the brake pipe and on the opposite side to brake pipe pressure and the pressure of said spring.

15. In an automatic train control equipment, the combination with apparatus operated upon a change in the signal indication for effecting an application of the brakes, of a brake pipe, a fluid pressure controlled valve device operative to prevent the operation of said apparatus and comprising valve means, a spring, and a diaphragm subject to the opposing pressures of said spring and a chamber, and means controlled by brake pipe pressure for controlling the fluid pressure in said chamber.

16. In an automatic train control equipment, the combination with a brake pipe, of apparatus for effecting an automatic train control application of the brakes, a valve device operated by fluid pressure for suppressing the operation of said apparatus to effect an application of the brakes, means for supplying fluid discharged from the brake pipe in effecting a reduction in brake pipe pressure to said valve device, means operated upon a predetermined reduction in brake pipe pressure for supplying fluid to said valve device, and a brake valve device having a brake application position in which fluid is supplied to said valve device.

17. In an automatic train control equipment, the combination with a brake pipe, of apparatus for effecting an automatic train control application of the brakes, a valve device operated by fluid pressure for suppressing the operation of said apparatus to effect an application of the brakes, means for supplying fluid discharged from the brake pipe in effecting a reduction in brake pipe pressure to said valve device, means operated upon a predetermined reduction in brake pipe pressure for supplying fluid to said valve device, and a brake valve device having means for supplying fluid to said valve device in the service application position.

18. In an automatic train control equipment, the combination with a brake pipe, of apparatus for effecting an automatic train control application of the brakes, a valve device operated by fluid pressure for suppressing the operation of said apparatus to effect an application of the brakes, means for supplying fluid discharged from the brake pipe in effecting a reduction in brake pipe pressure to said valve device, means operated upon a predetermined reduction in brake pipe pressure for supplying fluid to said valve device, and a brake valve device having means for supplying fluid to said valve device in the service application position and for venting fluid from said valve device in a position in which the brakes are released.

19. In an automatic train control equipment, the combination with a brake pipe, of apparatus for effecting an automatic train control application of the brakes, a valve device operated by fluid pressure for suppressing the operation of said apparatus to effect an application of the brakes, means for supplying fluid discharged from the brake pipe in effecting a reduction in brake pipe pressure to said valve device, means operated upon a predetermined reduction in brake pipe pressure for supplying fluid to said valve device, and a brake valve device having means for supplying fluid to said valve device in the service application position and for venting fluid from said valve device in normal running position.

20. In an automatic train control equipment, the combination with a brake pipe, of apparatus for effecting an automatic train control application of the brakes, a valve device operated by fluid pressure for suppressing the operation of said apparatus, and a brake valve device for supplying fluid under pressure to said valve device upon movement thereof to effect an application of the brakes.

21. In an automatic train control equipment, the combination with a brake pipe, of apparatus for effecting an automatic train control application of the brakes, a valve

ANALOGOUS SYSTEMS

18 device operated by fluid pressure for suppressing the operation of said apparatus, and a brake valve device for supplying fluid under pressure to said valve device upon movement thereof to effect a reduction in brake pipe pressure.

22. In an automatic train control equipment, the combination with a brake pipe, of apparatus for effecting an automatic train control application of the brakes, a valve device operated by fluid pressure for suppressing the operation of said apparatus, and a brake valve device for supplying fluid from the brake pipe to said valve device upon movement thereof to service application position.

23. In an automatic train control equipment, the combination with a brake pipe, of apparatus for effecting an automatic train control application of the brakes, a valve device operated by fluid pressure for suppressing the operation of said apparatus, and a brake valve device for supplying fluid under pressure to said valve device upon movement thereof to effect an application of the brakes, communication from the brake valve device to said valve device being cut off upon movement of said apparatus to effect an application of the brakes.

24. In an automatic train control equipment, the combination with a brake pipe, of apparatus for effecting an automatic train control application of the brakes, a valve device operated by fluid pressure for suppressing the operation of said apparatus, a brake valve device for supplying fluid under pressure to said valve device upon movement thereof to effect a reduction in brake pipe pressure, and means operating upon movement of said apparatus to effect a train control application for preventing the supply of fluid from said brake valve device to said valve device.

25. In an automatic train control equipment, the combination with a brake application valve device, of a suppression valve device operated by fluid under pressure for preventing the operation of said brake application valve device and a brake valve device having a position for supplying fluid under pressure to said suppression valve device, communication through which fluid is supplied from the brake valve device to the suppression valve device being cut off upon movement of said application valve device to application position.

26. In an automatic train control apparatus, the combination with a brake pipe and a reduction reservoir, of a brake application valve device operative to effect the discharge of fluid from the brake pipe to said reservoir and a brake valve device having a position for venting fluid from said reservoir.

27. In an automatic train control apparatus, the combination with a brake pipe and a reduction reservoir, of a brake application valve device operative to effect the discharge of fluid from the brake pipe to said reservoir and a brake valve device having a position for connecting said reservoir to the atmosphere.

28. In an automatic train control apparatus, the combination with a brake pipe and a reduction reservoir, of a brake application valve device operative to effect the discharge of fluid from the brake pipe to said reservoir and a brake valve device adapted in a release position to connect said reservoir to the atmosphere.

29. In an automatic train control apparatus, the combination with a brake pipe and a reduction reservoir, of a brake application valve device operative to effect the discharge of fluid from the brake pipe to said reservoir and a brake valve device having a release position in which a connection from said reservoir is connected to the atmosphere, and a lap position in which said connection is blanked.

30. In an automatic train control equipment, the combination with apparatus for effecting an automatic train control application of the brakes and having a passage the venting of fluid from which is adapted to effect the operation of said apparatus, of a suppression valve device for controlling communication through said passage and a normally charged reservoir connected to said passage.

31. In an automatic train control equipment, the combination with apparatus including a piston operable by a reduction in fluid pressure for effecting an application of the brakes and a governor controlled valve for venting fluid through a passage from said piston, of a suppression valve device having a valve for controlling communication through said passage from said piston to said governor valve and a reservoir, normally charged with fluid under pressure and connected to said passage between said suppression valve and said piston.

32. In an automatic train control equipment, the combination with apparatus including a piston connected to a passage adapted to be charged with fluid under pressure by way of a restricted port around said piston and said piston being operated by a reduction in pressure in said passage for effecting an application of the brakes, of a governor controlled valve for venting fluid from said passage, a valve operable to cut off communication from said piston to said governor valve, and a reservoir connected to said passage between the cut-off valve and said piston.

33. In an automatic train control equipment, the combination with apparatus for effecting a train control application of the brakes and including an application valve device, of a valve device operated by fluid under pressure for suppressing the operation of said apparatus and having a passage through which the fluid pressure on said suppression valve device is controlled, said passage being controlled by said application valve device and being connected to the atmosphere in the application position of said application valve device.

34. In an automatic train control equipment, the combination with apparatus for effecting a train control application of the brakes, of a valve device operative to prevent the operation of said apparatus and including a diaphragm controlled by variations in fluid pressure in a passage, and a valve device for controlling the fluid pressure in said passage and including a double beat valve for controlling communication from said passage through a restricted port and then past said valve to an unrestricted exhaust port.

35. In an automatic train control equipment, the combination with apparatus for effecting an automatic train control application of the brakes, of a brake valve device having an operating handle, and a release valve mechanically operated by the movement of said handle, said apparatus including a piston operated upon a reduction in pressure in a passage, and a valve adapted upon movement of said apparatus to application position to connect said passage with said release valve.

36. In an automatic train control equipment, the combination with apparatus for effecting an automatic train control application of the brakes, of a brake valve device having an operating handle, and a release valve mechanically operable by the movement of said handle, and adapted to be seated in a lap position and unseated in a brake release position of the brake valve, said apparatus including a controlling piston operable upon a reduction in fluid pressure in a passage and a valve adapted in the application position of said apparatus to connect said passage with said release valve.

37. In an automatic train control equipment, the combination with apparatus for effecting an automatic train control application of the brakes, of a brake valve device having an operating handle, a valve for controlling the operation of said apparatus in releasing the brakes, and a cam movable with said handle for controlling the operation of said valve.

38. In an automatic train control equipment, the combination with a brake application control pipe, of a cut-out cock for controlling communication through said pipe and a second cut-out cock having a position for connecting said pipe to an exhaust port.

39. In an automatic train control equipment, the combination with a brake application portion and a speed governor portion, of a fluid pressure supply pipe, an application pipe connecting the governor portion with the brake application portion, a brake pipe, a cut-out cock having a position for closing communication through said supply pipe and for connecting the governor side of said application pipe with an exhaust port, and a cut-out cock having a position for establishing communication through the brake pipe, and from the governor portion side to the application portion side of said application pipe.

40. In an automatic train control equipment, the combination with a brake application portion and a speed governor portion, of an application pipe connecting the governor portion with the brake application portion, a cut-out cock for controlling communication from the governor portion through said pipe to the brake application portion, and a cut-out cock having a position for connecting to an exhaust port, that portion of the application pipe between the first mentioned cut-out cock and the governor portion.

41. In an automatic train control equipment, the combination with apparatus for effecting a train control application of the brakes, of a brake pipe, a fluid pressure controlled valve device for venting fluid from the brake pipe, a brake valve device, and a cut-out cock for controlling communication from the brake valve device to the brake pipe, said brake valve device having a position for varying the fluid pressure on said vent valve device to operate same and thereby effect a reduction in brake pipe pressure.

42. In an automatic train control equipment, the combination with apparatus for effecting a train control application of the brakes, of a brake pipe, a fluid pressure controlled valve device for venting fluid from the brake pipe, a brake valve device, and a cut-out cock for controlling communication from the brake valve device to the brake pipe, said brake valve device being adapted in emergency position to supply fluid under pressure to said vent valve device to operate the same and thereby effect a reduction in brake pipe pressure.

In testimony whereof we have hereunto set our hands.

CLYDE C. FARMER.
THOMAS H. THOMAS.

DISCLAIMER

Re. No. 16,814. *Clyde C. Farmer*, Pittsburgh, and *Thomas H. Thomas*, Edgewood, Pa. SPEED-CONTROL EQUIPMENT. Patent dated December 13, 1927. Disclaimer filed March 27, 1934, by the assignee, *The Westinghouse Air Brake Company*, said patentee *Clyde C. Farmer*, and *Mable M. Thomas*, executrix of *Thomas H. Thomas*, deceased, concurring and assenting.

Hereby enters this disclaimer to those claims which are in the following words:

"1. In an automatic train control apparatus, the combination with a brake pipe, of means operative upon a change in the signal indication for at one time effecting a reduction in brake pipe pressure in a single stage and at another time in two stages.

"2. In an automatic train control apparatus, the combination with a brake pipe, of means operating in accordance with the character of the change in the signal indication for either effecting a reduction in brake pipe pressure in one stage or in two stages."

[*Official Gazette August 7, 1934.*]